United States Patent
Pendse et al.

(10) Patent No.: US 11,451,569 B1
(45) Date of Patent: Sep. 20, 2022

(54) FILE EXTRACTION FROM NETWORK DATA TO ARTIFACT STORE FILES AND FILE RECONSTRUCTION

(71) Applicant: Arbor Networks, Inc., Westford, MA (US)

(72) Inventors: Bhargav M. Pendse, Pune (IN); Neil Richard Terry, Cedar Hills, UT (US)

(73) Assignee: Arbor Networks, Inc., Westford, MA (US)

( * ) Notice: Subject to any disclaimer, the term of this patent is extended or adjusted under 35 U.S.C. 154(b) by 0 days.

(21) Appl. No.: 17/354,153

(22) Filed: Jun. 22, 2021

(30) Foreign Application Priority Data

Apr. 17, 2021 (IN) .............................. 202111017891

(51) Int. Cl.
*H04L 9/40* (2022.01)
*H04L 67/06* (2022.01)
*H04L 67/1097* (2022.01)

(52) U.S. Cl.
CPC ...... *H04L 63/1425* (2013.01); *H04L 63/1416* (2013.01); *H04L 63/20* (2013.01); *H04L 67/06* (2013.01); *H04L 67/1097* (2013.01)

(58) Field of Classification Search
CPC . H04L 63/1425; H04L 63/1416; H04L 63/20; H04L 67/06; H04L 67/1097; H04L 63/1408
See application file for complete search history.

(56) References Cited

U.S. PATENT DOCUMENTS

| | | | |
|---|---|---|---|
| 6,532,517 B1 * | 3/2003 | Wagner ................. | G06F 3/0601 711/112 |
| 8,504,519 B1 * | 8/2013 | Sachs ...................... | G06F 16/27 707/758 |
| 2003/0217033 A1 * | 11/2003 | Sandler ............... | G06F 16/2264 |
| 2006/0149753 A1 * | 7/2006 | Medard ................. | H04L 67/104 |
| 2010/0250918 A1 * | 9/2010 | Tremblay ............ | H04L 47/2441 706/46 |
| 2012/0271941 A1 * | 10/2012 | Mirandette ........... | G06F 16/955 709/224 |
| 2015/0149407 A1 * | 5/2015 | Abbott .................... | G06F 16/13 707/610 |

(Continued)

*Primary Examiner* — Muhammad Raza
(74) *Attorney, Agent, or Firm* — Locke Lord LLP; Scott D. Wofsy; Christopher J. Capelli (57) ABSTRACT

A method is provided of extracting file content from a live stream of network data streaming multiple files. The method includes receiving artifact chunks each including a portion of file content of a file of the multiple files as identified by DPI at first capture of the network data, storing the artifact chunks in an artifact chunk section of an artifact store for linearly storing the artifact chunks in an order as received, storing artifact chunk information (ACI) for each artifact chunk in a chunk table section of the artifact store, the ACI identifying the artifact chunk, identifying another artifact chunk of the file, and identifying a location of the artifact chunk in the artifact chunk section, and storing a unique artifact locator identifier (ALI) that uniquely identifies a storage location within the artifact store of an artifact chunk associated with file, wherein the ALI and ACI associated with the artifact chunks are configured to locate each artifact chunk associated with the file that is stored in the artifact store for future reconstruction of the file.

12 Claims, 7 Drawing Sheets

(56) References Cited

U.S. PATENT DOCUMENTS

| | | | | |
|---|---|---|---|---|
| 2019/0166013 A1* | 5/2019 | Shaikh | ................ | H04L 41/5022 |
| 2021/0021616 A1* | 1/2021 | Shabtai | ............... | H04L 63/1416 |
| 2021/0342783 A1* | 11/2021 | Pasala | .................... | G06N 5/022 |

* cited by examiner

FILE EXTRACTION FROM NETWORK DATA TO ARTIFACT STORE FILES AND FILE RECONSTRUCTION

BACKGROUND

1. Field of the Disclosure

The present disclosure relates to file extraction from network data to artifact store files, file reconstruction, and artifact store files, and in addition to handling requests for reconstruction of one or more files of interest.

2. Description of Related Art

One aspect of network security is location of threats within network data. Threats can be in the form of malicious files that were transferred to a computer network. One way of detecting these malicious files is to capture all network data on the network, extract file content from the network data, and store the extracted file content to disk in its exact, original form. This extracted file can then be processed using file security tools for analysis of the extracted file.

An existing method for capturing network data includes capturing packets, storing the captured packets, performing deep packet inspection (DPI) on the stored packets to extract metadata, using the metadata to generate a capture file of the captured data that is stored to disk (such as in a standard format, e.g., PCAP, or a proprietary format). The capture file is then retrieved from the disk and processed by a file extraction program. The file extraction program extracts all files found in network threads of the stored data by invoking DPI and stores all of the extracted files to disk. This process can produce one file or millions of files, which presents a file management challenge and can negatively affect file system performance.

Data is stored to disk twice and DPI is invoked twice in this process. In addition, various efficiencies arise due to the large amount of writing to and reading from disk that can occur and the potentially large number of files that can be created. Furthermore, when the network data is received in multiple threads, synchronization of access to storage can further complicate management of the captured network data. Further inefficiencies arise, since all network data is extracted, which can include network data that is not needed for the analysis task at hand.

Furthermore, the reconstruction process can be cumbersome. When reconstruction of a particular file is desired, it may be necessary to sort through the extracted files (which can include millions of files) to identify a file of interest.

A commercially available method that invokes DPI only once uses hash generation for file extraction. This method only provides the ability for identification of an extracted file, but does not provide contents of the file.

While conventional methods and systems have generally been considered satisfactory for their intended purpose, there is still a need in the art for file extraction and reconstruction processes having improved efficiency and capability.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of extracting file content from a live stream of network data streaming multiple files. The method includes receiving artifact chunks, wherein each artifact chunk includes a portion of file content of a file of the multiple files as identified by deep packet inspection (DPI) at first capture of the network data. The method further includes storing the artifact chunks in an artifact chunk section of an artifact store for linearly storing the artifact chunks in an order as received and storing artifact chunk information (ACI) for each artifact chunk in a chunk table section of the artifact store. The ACI identifies the artifact chunk, identifies another artifact chunk of the file, and identifies a location of the artifact chunk in the artifact chunk section. The method further includes storing a unique artifact locator identifier (ALI) that uniquely identifies a storage location within the artifact store of an artifact chunk associated with file, wherein the ALI and ACI associated with the artifact chunks are configured with the ability to locate each artifact chunk associated with the file that is stored in the artifact store for future reconstruction of the file.

In accordance with a further aspect of the disclosure, an artifact store is provided that stores artifact chunks associated with multiple files extracted from a live stream of network data. The artifact store has multiple artifact store files. Each artifact store file includes an artifact chunk section for storing the artifact chunks in an order as received, from first to last, per thread and a chunk table section for storing artifact chunk information (ACI) for each of the artifact chunks. Artifact chunks associated with a file of the multiple files that exceed the capacity of a first artifact store file of the multiple artifact store files are stored in the order as received in a next artifact store file of the multiple artifact store files. The artifact chunks associated with the file are stored in a series of artifact store files in which the artifact store files are ordered from first to last. The ACI for artifact chunks associated with the file that are stored in more than one artifact store files of the multiple artifact store files include inter-artifact store file pointers that enable sequentially pointing to a selected artifact chunk associated with the file in each of the artifact store files having artifact chunks associated with the file in a backward reverse direction from last stored to first stored. The ACI for artifact chunks associated with the file in the same artifact store file include intra-artifact store file pointers that enable sequentially pointing to each of the artifact chunk associated with the file in the same artifact store file in a forward direction from first stored to last stored, beginning pointing at the selected artifact chunk.

In accordance with another aspect of the disclosure a method is provided of reconstructing a file from an artifact store storing artifact chunks associated with multiple files extracted from a live stream of network data. The method includes accessing the artifact store, wherein the artifact store includes multiple artifact store files. The artifact store is configured for forward sequential pointing within an artifact store file and for reverse sequential pointing between artifact store files. Starting with an artifact store file that includes a final artifact chunk that is the last artifact chunk associated with the file stored in the artifact store, and repeating until after an artifact store file having an earliest first artifact chunk of the file is processed, sequentially pointing in the reverse direction to a selected artifact chunk of each artifact store file storing an artifact chunk associated with the file for processing the artifact store that is pointed at, wherein the artifact store file being pointed to is treated as the current artifact store file. The method further includes processing the current artifact store file that is pointed at by building a sorted list of artifact chunks in the current artifact store file by sequentially pointing in the forward direction to each artifact chunk stored in the current artifact store file, beginning from the first artifact chunk to the last artifact chunk stored in the current artifact store file, and appending the sorted list in front of the sorted list built for an artifact store file that was processed immediately prior to processing the current artifact store file.

In accordance with aspects of the disclosure, a computer system is provided that performs the disclosed method. In accordance with further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
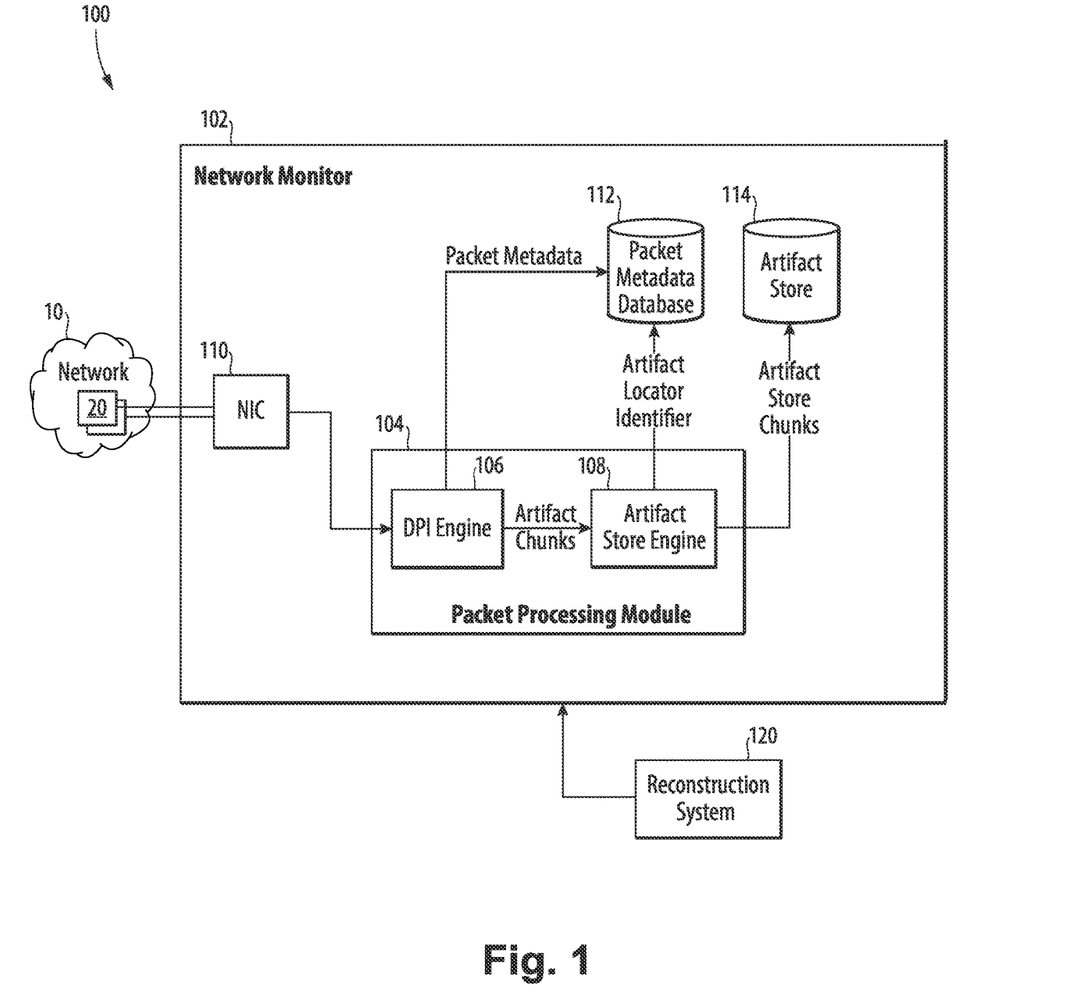
FIG. 1 illustrates a block diagram of an example network system having a network monitor with an artifact store engine for extracting files from network data, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network monitor system in accordance with the disclosure is shown in FIG. 1, wherein the network monitor system is designated generally by reference character 100. Methods associated with monitoring operations for extracting files from network data and reconstructing files per request associated with a protected network of the network monitor system 100 in accordance with the disclosure, or aspects thereof, are provided in FIGS. 2-7, as will be described.

With reference now to FIG. 1, network monitor system 100 includes a network monitor 102 that monitors a network 10 for extracting files that can later be reconstructed e.g., upon request, by reconstruction system 120.

Network 10 can include one or more local area networks (LANs) and/or one or more wide area networks (WANs). Computing devices, such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets.

Network monitor 102 includes a network interface card (NIC) 110, a packet processing module 104, a packet metadata database 112, and an artifact store 114. While packet metadata database 112 and artifact store 114 are shown integrated with network monitor 102, packet metadata database 112 and/or artifact store 114 can be disposed remote from and accessible by network monitor.

Network monitor 102 includes a computing device with a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. Network monitor 102 can be implemented as one or more physical or virtual devices. Whether implemented as physical or virtual device(s), network monitor 102 uses a local or remote hardware processing device that executes software instructions, which enables performance of the disclosed functions. In one or more embodiments, portions of network monitor 102 can be disposed in a cloud (e.g., connected to a remote network and/or the Internet (e.g., via network 10)). Packet metadata database 112 and artifact store 114 can also include computing devices with processing capabilities, such as for managing and querying the associated database.

NIC 110 of network monitor 102 can be configured to communicate with one or more intercept devices 20 disposed within or external to network 20 and network monitor 110. Intercept devices 20 can be central or distributed devices that actively or passively intercept network data, including packets of network traffic propagating through, to, and/or from network 10. Intercept devices 20 include software, firmware, and/or hardware components, such as taps, probes, or port mirrors that can be positioned inline and/or remote relative to communication links or devices included within or external to network 10.

Network data received by NIC 110 can be received in one or more parallel threads and passed to packet processing module 104 in corresponding parallel threads. The network data is processed using deep packet inspection (DPI) once by DPI engine 106, during which packet metadata is determined from the network data and stored per file in packet metadata database 112. The packet metadata includes, for example layer 2 information, including MAC addresses; layer 3 information, including protocol, IP addresses, and packet length; layer 4 information, including protocol ports, and/or layer 5-7 information, including application data, HTTPS certificates, HTTP URL, file transport (FTP) filename.

The network data received by NIC 110 and forwarded to DPI engine 106 includes multiple files, which can be of varying types corresponding different applications used by computing devices operating on network 10. The DPI process also outputs artifact chunks that are provided to artifact store engine 108. Each artifact chunk includes a portion of file content of one of the files included in the network data. DPI engine 106 can be, for example, a DPI engine used by any of the nGenius™ servers, or any next generation server available from NetScout Systems™, Inc. of Westford, Mass.

Artifact store engine 108 receives the artifact chunks. The term "receive" is meant to be interpreted broadly, and can include receiving via a transmission, accessing, reading a memory location, or otherwise obtaining. The artifact chunks can be received in multiple threads. A file can include multiple chunks that are provided via a single thread.

Artifact store engine 108 accesses artifact store 114 for storing the artifact chunks in artifact store 114. Artifact store 114 includes at least one artifact store that stores a fixed number of artifact chunks, and can include a very large number of artifact store files, such as on the order of hundreds or thousands of artifact store files.

As DPI engine 106 outputs one or more threads of artifact chunks, the artifact chunks of each thread are directed to a different instance of artifact store 114 and are stored linearly in order in an artifact file store of its artifact store instance. Since each thread output by DPI engine 106 uses a separate artifact store instance, there is no need to use synchronization tools, such as locks or mutexes, for managing access to artifact store 114 by multiple threads.

When a storage capacity of the artifact store file associated with the thread is filled, a new artifact store file of the artifact store instance is provided for storing remaining artifact chunks of the thread. This can create a series of artifact store files for each artifact store instance. Each thread output by DPI engine 106 thread may include artifact chunks for multiple flows. For each artifact store instance, the artifact chunks associated with each of the flows are stored linearly in order in the series artifact store files. Artifact chunks of different flows can be interleaved with one another in an artifact store file and throughout the series of artifact store files of each artifact store instance. However, the artifact chunks of each flow are stored in their respective artifact store instance in the order in which they were received from DPI engine 106.

Figure 2:
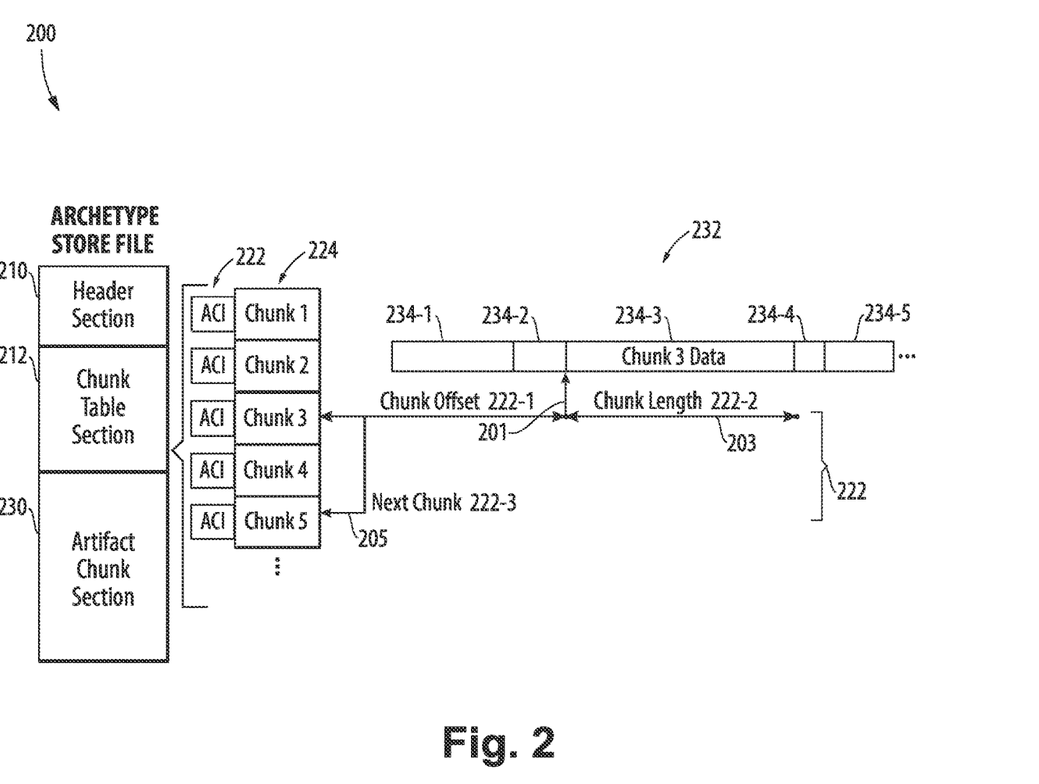
FIG. 2 is a schematic diagram of an example artifact store file, including exploded portions of a chunk table section and an artifact chunk section, in accordance with an aspect of the disclosure.

With reference to FIG. 2, an example artifact store file 200 is shown. Each artifact store file 200 includes a header section 210, a chunk table section 220 having artifact chunk information (ACI) 222 associated with a Chunk ID 224 for each chunk, and an artifact chunk section 230. The artifact store files 200 are each configured so that information stored can be accessed by memory mapping.

Header section 210 stores a header for the artifact store file 200. The header includes information about the artifact store file 200, such as a unique identifier of the artifact store file 200 and the number of entries in a chunk table of the chunk table section (meaning the number of chunks stored in the artifact store file 200). The header can be kept small for being quickly readable during a reconstruction procedure. In one or more embodiments, the header section 210 has a predefined, fixed size.

The identifier of the artifact store file 200 can be its location, which can be represented as: base_directory/artifact_store/stores_store_seed/store_asf_seed, wherein base_directory uniquely identifies the directory used to store one or more artifact stores, although in embodiments there is only one artifact_store; artifact_store uniquely identifies the location of the artifact_store 114 within base_directory; store_storeseed uniquely identifies a store instance directory within artifact_store, with a separate store instance directory being assigned to each thread; and store_asf_seed uniquely identifies the artifact_store file 200 within store_storeseed. An example identifier for the artifact_store file 200 is /xdr/artifact_store/stores_9/store_1565634343388998, which represents an artifact_store file 200 assigned a store_storeseed identifier to uniquely identify the artifact_store file 200 within a ninth instance of the artifact_store 114 (that corresponds to the ninth thread of network data received from DPI engine 106), wherein the artifact_store is named artifact_store and is located in the xdr directory of (or accessible to) network monitor 100. In the example shown, store_storeseed is a large number that uses a file naming convention that indicates a number of microseconds since a reference time (e.g., and epoch) at which the artifact_store file 200 was created. As is discussed further below, store_storeseed is used for forming a part of an artifact locator identifier (ALI).

Artifact chunk section 230 stores the content of the actual artifact chunks. Each artifact chunk starts at a location that has a unique identifier Chunk ID 224 for the artifact store file 200. The size of artifact chunk section 230 can vary based on the size of the stored artifact chunks. Chunk ID 224 can be used as the identifier for the artifact chunk in its associated ACI 222. A portion of storage area 232 of artifact chunk section 230 is shown, in which storage of chunk content 234 for the first five chunks are shown (referenced as 234-1, 234-2, 234-3, 234-4, 234-5, respectively. Chunk content 234-3 for the third chunk (labeled Chunk 3 Data) is shown in greater detail.

Chunk table section 220 includes a chunk table 224 that stores the ACI 222 for each artifact chunk (e.g., chunk 1, chunk 2, chunk 3, chunk 4, chunk 5, etc.) stored in the artifact store file 200. In one or more embodiments, the chunk table section 220 has a predefined, fixed size. The ACI 222 for each artifact chunk includes location information (e.g., Chunk ID) that can be used to identify the artifact chunk and locate the artifact chunk within the artifact store file 200, intra-artifact store file linkage information that can be used to link artifact chunks together that are located in the same artifact store file, and inter-artifact store file linkage information that can be used to link artifact chunks together that are located in different artifact store file's when the artifact chunks of a file span multiple artifact store file's, thus enabling future reconstruction of the file to which the artifact chunk belongs.

In an example, the location information includes a chunk offset 222-1 that is an offset from a reference location at the beginning of the artifact chunk section 230 at which the contents of the actual chunk are stored. Arrow 201 shows the chunk offset 222-1 of ACI 222 that defines a beginning location at which the chunk content 234-3 for the third chunk is stored in artifacts chunk section 230. This location is unique to the third chunk (labeled Chunk 3) within this artifact store file 200, and therefore can be used as identification Chunk ID for third chunk. The location information of ACI 222 further includes chunk length 222-2, which defines a length of the chunk contents 234 stored in the artifact chunk section 230. The chunk length 222-2 of the chunk contents 234-3 of the third chunk is indicated by arrow 203.

In one or more embodiments, the intra-artifact store file linkage information uses forward references and includes next chunk 222-3 to identify a next artifact chunk that belongs to the same file and is stored in the same artifact store file 200. Next chunk 222-3 can include a location or identification (e.g., Chunk ID) of the next artifact chunk. Next chunk 222-3 of the third chunk is indicated by arrow 205 and points to the fifth chunk (labeled Chunk 5).

It is noted that next chunk 222-3 of the third chunk is the fifth chunk, and not the fourth chunk (labeled Chunk 4). This is because the fourth chunk does not belong to a different flow than the third chunk, and therefore is not associated with the same file. The fifth chunk does belong to the same flow as third chunk and is therefore pointed to by the next chunk 222-3. This intra-artifact store file linkage information will enable reconstruction of the file in the future.

In one or more embodiments, the inter-artifact store file linkage information uses reverse reference, meaning it includes a location or identification (e.g., storeseed) of a previous artifact store file that was filled immediately prior to beginning filling the current artifact store file 200 of the artifact chunk.

In an example, without limiting the disclosure to this specific example, in order to support the reverse references, the inter-artifact store file linkage information of each artifact chunk further includes a location or identification (e.g., Chunk ID) of a first artifact chunk of its artifact store file 200 and the inter-artifact store file linkage information of the first artifact chunk of each artifact store file 200 includes the location or identification (e.g., storeseed) of the previous artifact store file or alternatively indicates that there is no previous artifact store file 200. The intra-artifact store file linkage information can further include indicators (e.g., flags, such as a bitwise set of flags) indicating whether an artifact chunk is the first chunk of the file, the first chunk in the artifact store, or the last chunk of the file.

Figure 3:
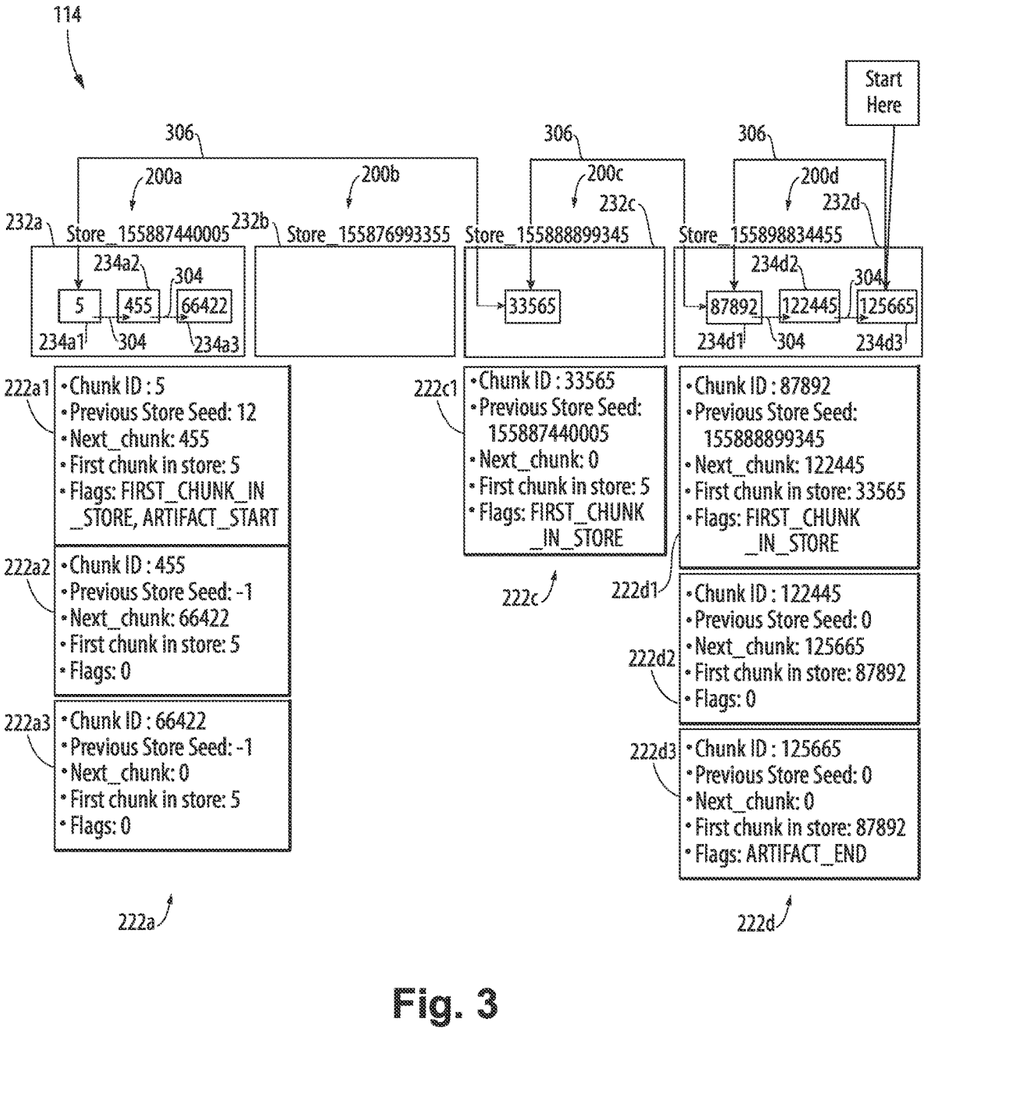
FIG. 3 is a schematic diagram of an example portion of an artifact chunk section and associated artifact chunk information showing example c and example inter-artifact store file linkages, in accordance with an aspect of the disclosure.

With reference to FIG. 3, a portion of artifact store 114 is shown in a current state at a point of time. In its current state, artifact store 114 includes artifact store files 200a, 200b, 200c, and 200d. Each of artifact store files 200a, 200b, 200c, and 200d is assigned a unique storeseed that identifies it. The respective storeseeds for artifact store files 200a, 200b, 200c, and 200d are 155887440005, 155876993355, 155888899345, and 155898834455.

Storage area 232a of artifact store file 200a is shown, including chunk content 234a1, 234a2, and 234a3 related to artifact chunks stored in storage area 232a that are associated with a file of interest. Any other chunk content 234 stored in storage area 232a is not associated with the file of interest and is therefore not shown. Artifact store file 200a's ACI 222a is listed for chunk content 234 that is shown in storage area 232. Specifically, ACI 222a1 is shown with contents of ACI associated with artifact chunk having chuck content 234a1. ACI 222a2 is shown with contents of ACI associated with artifact chunk having chuck content 234a2. ACI 222a3 is shown with contents of ACI associated with artifact chunk having chuck content 234a3.

Storage area 232b of artifact store file 200b is shown, but does not include any chunk content related to artifact chunks in storage area 232b that are associated with the file of interest. The contents of storage area 232b are apparently related to files other than the file of interest. ACI 222 for artifact store file 200b is not shown.

Storage area 232c of artifact store file 200c is shown, including chunk content 234c1 related to an artifact chunk stored in storage area 232c that is associated with the file of interest. Any other chunk content 234 stored in storage area 232c is not associated with the file of interest and is therefore not shown. Artifact store file 200c's ACI 222c is listed for chunk content 234 that is shown in storage area 232. Specifically, ACI 222c1 is shown with contents of ACI associated with artifact chunk having chuck content 234c1. Any other chunk content 234 stored in storage area 232c is not associated with the file of interest and is therefore not shown.

Storage area 232d of artifact store file 200d is shown, including chunk content 234d1, 234d2, and 234d3 related to artifact chunks stored in storage area 232d that are associated with a file of interest. Any other chunk content 234 stored in storage area 232d is not associated with the file of interest and is therefore not shown. Artifact store file 200d's ACI 222d is listed for chunk content 234 that is shown in storage area 232. Specifically, ACI 222d1 is shown with contents of ACI associated with artifact chunk having chuck content 234d1. ACI 222d2 is shown with contents of ACI associated with artifact chunk having chuck content 234a2. ACI 222d3 is shown with contents of ACI associated with artifact chunk having chuck content 234d3. Any other chunk content 234 stored in storage area 232d is not associated with the file of interest and is therefore not shown.

Intra-artifact store file linkages 304 are shown that are used for forward referencing from the first to last artifact chunks (meaning in the order in which they were stored, which is the forward direction) associated with the file of interest stored in the storage area 232 of each respective artifact store file 200a. This is supported by the ACI 222 of each of the artifact chunks, and particularly by ACI entry Chunk ID (also shown as chunk offset (or Chunk ID 222-1) in FIG. 2) and ACI entry Next_Chunk (also shown as next chunk 222-3 in FIG. 2).

In the example shown in FIG. 3, intra-artifact store file linkages 304 are used to point within artifact store file 200a from the first chunk (having Chunk ID 5) to the second chunk (having Chunk ID 455), and from the second chunk (having Chunk ID 455) to the third chunk (having Chunk ID 66422). Intra-artifact store file linkages 304 are also used to point within artifact store file 200d from the first chunk (having Chunk ID 87892) to the second chunk (having Chunk ID 122445), and from the second chunk (having Chunk ID 122455) to the third chunk (having Chunk ID 125665).

Inter-artifact store file linkages 306 are shown that are used for reverse referencing by pointing in a reverse direction opposite the forward direction from an artifact chunk of one artifact store file 200 to a selected artifact chunk in the previous artifact store file 200. This is supported by the ACI 222 of each of the artifact chunks associated with the file of interest and stored in an artifact store file 200, and particularly by ACI entry PreviousStoreSeed, which includes the storeseed of the immediately previous store file storing artifact chunks associated with the file of interest if the artifact chunk is the first artifact chunk in its artifact store file 200, indicates (by being set to a value of 0 in this example) that the artifact chunk is not the first artifact chunk in its artifact store file, or indicates (by being set to a value of −1 in this example) that there is no immediately previous artifact store file 200; First_chunk_in_store, which, for ACI associated with any artifact chunk that is not the first artifact chunk in the artifact store file 200, includes the Chunk ID of the first artifact chunk associated with the file of interest of the same artifact store file 200, and for ACI associated with any artifact chunk that is the first artifact chunk in the artifact store file 200, includes the Chunk ID of the first artifact chunk of the immediately previous artifact store file 200;

and the flag FIRST_CHUNK_IN_STORE, which indicates that the artifact chunk is the first artifact chunk in its artifact store file 200.

In the example shown in FIG. 3, inter-artifact store file linkages 306 are used to point in the reverse direction from the first artifact chunk in one of the artifact store file 200s to the first artifact chunk in its immediately preceding artifact store file 200. Furthermore, the last artifact chunk in each artifact store file 200 points to the first artifact chunk in its artifact store file 200. This is because each artifact chunk that is stored in an artifact store file 200 is potentially the last artifact chunk in that artifact store file 200, that is until a next artifact chunk is stored in that artifact store file (if any). The first artifact chunk in the artifact store file includes the storeseed of the immediately preceding artifact store file 200 and the Chunk ID of the first artifact chunk stored in the immediately preceding artifact store file 200. In this way, inter-artifact store file linkages 306 are operational because the last artifact chunk in the artifact store file 200 always points to the first artifact chunk in that artifact store file 200, which can then point to the first artifact chunk of the immediately previous artifact store file 200.

More specifically, an inter-artifact store file linkage 306 is used to point from the last chunk in artifact store file 200d (having Chunk ID 125665) to the first artifact chunk in artifact store file 200d (having Chunk ID 87892). The next inter-artifact store file linkage 306 (in reverse order) points to the first artifact chunk of artifact store file 200c (having Chunk ID 33565). Since the first artifact chunk of artifact store file 200c is also the last chunk of artifact store file 200c, an inter-artifact store file linkage 306 is used to point from this last artifact chunk of artifact store file 200c (also having Chunk ID 33565, since it is the same as the first artifact chunk in artifact store file 200c) to the first artifact chunk of artifact store file 200a (having Chunk ID 5).

Once all of the artifact chunks of a file of interest are stored in artifact store 114, the file of interest can be reconstructed using identification of the final artifact chunk of the file of interest 308 as well as the intra-artifact store file linkages 304 and the inter-artifact store file linkages 306 until all of the artifact chunks of the file of interest have been accessed for the reconstruction. This is supported by the ACI 222 of each of the artifact chunks, and particularly by flag ARTIFACT_END that indicates an artifact chunk is the final artifact chunk 308 of the file of interest and by flag ARTIFACT_START that indicates an artifact chunk is the initial artifact chunk 308 of the file of interest.

In order to facilitate handling a request for reconstruction of a file, wherein the request includes metadata that can be used to identify the file, an artifact locator identifier (ALI) is created for the file of interest and stored an association with the file of interest's metadata in packet metadata database 112. The ALI identifies the location of the final artifact chunk 308 of the file of interest by including identification of the artifact store instance in which the final artifact chunk 308 is stored, the storeseed of the final artifact chunk's 308 artifact store file 200, and the Chunk ID of the final artifact chunk 308. In this example, the final artifact chunk 308 (and the entire file of interest) are stored in the ninth artifact store instance, represented by "9:" and the ALI is 9:155898834455:125665.

Figure 4:
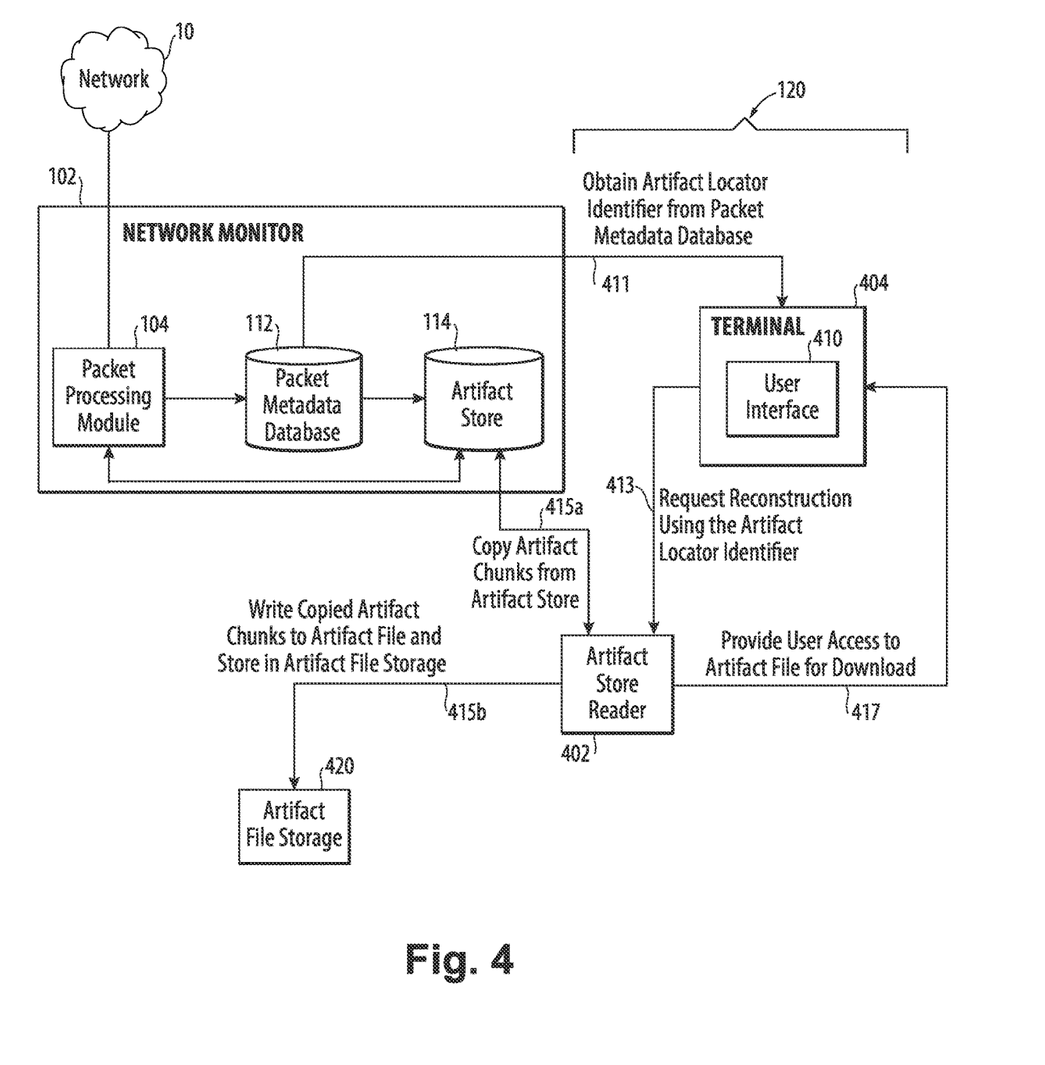
FIG. 4 illustrates a block, flow diagram of an example network system having an artifact store reader for reconstructing extracted files, in accordance with an aspect of the disclosure.

With reference to FIG. 4, a block flow diagram of example network monitor system 100 is shown, including components of reconstruction system 120 and flows within reconstruction system 120 and between components of reconstruction system 120 for reconstructing a file of interest.

Reconstruction system 120 includes an artifact store reader 402 and a terminal 404, each of which can include a computing device or share the computing device of another component of network monitor system 100. At flow 413, terminal 404 outputs a reconstruction request with an ALI of one or more respective files of interest that are requested to be reconstructed. The reconstruction request can be generated by processor of terminal 404 (e.g., based on an automatic process) or by a user.

The user or processor can enter the ALI and submit the reconstruction request at flow 413, or can first enter user selection data that is used to submit an ALI request at flow 413 to packet metadata database 112 to obtain the ALI(s) needed. The user selection data can be entered via a user interface 410 of terminal 404. The user interface 410 can include a graphical user interface (GUI) that enables the user to enter user selection data based on various criteria, such as one or more of file type, IP address of a destination or source of packets in the file(s) of interest, time constraints associated with the file(s) of interest, geolocation of the IP address of a destination or source of packets in the file(s) of interest, without limitation to particular criteria. The user interface can be provided via a software application that can access packet metadata database 112, such as a data analytics application. The selection data is used by terminal 404 to generate metadata that can be used to identify the one or more files of interest.

An ALI request that includes the metadata generated by terminal 404 is sent from terminal 404 to metadata database 112. Packet metadata database 112 includes database management software that can generate a query for selecting entries in packet metadata database 112 that have metadata that matches the metadata included with the ALI request. Furthermore, packet metadata database 112 replies to the ALI request with the ALI that is associated with the entries in packet metadata database 112 that have metadata that matches the ALI request. The response to the ALI request can be one ALI when there is only one file of interest, or multiple ALIs that correspond to respective multiple files of interest. The ALI(s) returned by packet metadata database 112 are included in the reconstruction request.

Artifact store reader 402 receives the reconstruction request and uses the ALI to reconstruct each file of interest by copying artifact chunks from artifact store 114 in a first process that includes flow 415a by which the artifact chunks are copied, and writing the copied artifact chunks for each file of interest to an artifact file in a second process that can be transmitted or stored, e.g., in artifact file storage 420 by flow 415b. At flow 417, a response to the reconstruction request can be provided to terminal 404 with access to each of the artifact files, e.g., with a link that can be used to download the artifact file(s) from artifact file storage 420.

In the first process performed by artifact store reader 402 for creating a sorted list for reconstructing each of the files of interest, a blank sorted list is provided with null entries. The ALI for each file of interest identifies the artifact store 114, and more particularly the artifact store instance, and more particularly the artifact file store 200, and the Chunk ID of the final artifact chunk of the file of interest. The identified artifact file store 200 and final artifact chunk are accessed using memory mapping.

For each file of interest, the ACI of the final artifact chunk is accessed for determining a pointer from the first_chunk_in_store in the ACI of the final artifact chunk. Forward pointing is used to point to each artifact chunk associated with the file in interest in the current artifact store file to access the ACI of the artifact chunk pointed at to 1) add the Chunk ID of the artifact chunk that is pointed at to the end of the sorted list for the artifact store file, 2) point to the next chunk. When the last artifact chunk in the artifact store file of the current artifact chunk (e.g., when next_chunk==0) is pointed at, its Chunk ID is added to the end of the sorted list for the artifact store file, completing the sorted list for the artifact store file, and the first artifact chunk of the current artifact store file provides information for reverse pointing to the immediately previous artifact store, namely the previous_store_seed and first_chunk (of the immediately previous artifact store file), unless there are no more previous_store_seeds (e.g., when previous_store_seed==0), which ends the first process and creation of the sorted list.

When pointing to the first_chunk of an artifact store file, a new sorted list is started for the artifact store file above the sorted list that was just completed. By repeating the forward pointing for each previous artifact store file pointed at, and then pointing in reverse to the previous_store_seed and its first_chunk, all of the artifact chunks associated with the file of interest are added to the sorted list. The sorted list includes the Chunk ID for each artifact chunk associated with the file of interest in the correct order. By applying this method to the example of FIG. 3, the following sorted list is obtained, each entry of the sorted list having a storeseed and Chunk ID:

155887440005:5
155887440005:455
155887440005:66422
155888899345:33565
155898834455:87892
155898834455:122445
155898834455:125665

The sorted list is used to reconstruct the file of interest as follows. Step 2, using the sorted list reconstruct the artifact. An artifact file is opened as an output file for storing retrieved artifact chunk content. For each entry in the sorted list, the artifact store file corresponding to the entry's storeseed is opened. The ACI for the artifact chunk identified by the entry's Chunk ID is accessed and the chunk length is determined. The artifact store file for the entry is accessed and the entry's artifact chunk is located and its content retrieved using the entry's Chunk ID (which provides the location in terms of offset from a reference location) and the determined artifact chunk's length. The retrieved content is written to the artifact file. This is repeated until all of the entries of the sorted list are processed, after which the artifact file can be closed and made available to a user or an application. Note that all accessing of the artifact store file, including the ACI and the artifact chunks can be performed using memory mapping.

In one or more embodiments, artifact store reader 402 can receive a reconstruction request that includes a list of ALIs. This list can be very large. In the first process, a sorted list can be generated for the file of interest associated with each ALI. When performing the second process, the artifact store files can be accessed sequentially in a single pass through artifact store 114, wherein the artifact chunk content retrieved is written to an artifact file that corresponds to the ALI for the file of interest to which the artifact file corresponds. This batch method takes advantage of kernel read-ahead optimizations by doing a single sequential pass through the artifact store files for reading the artifact chunk content.

When operating in this batch mode, artifact store reader 402 may limit the number of ALIs it will process per batch. This can help limit the number of output artifact files open simultaneously and avoid errors related to having too many file descriptors open at the same time. Also due to file system overhead associated with maintaining many files in a single directory, each batch can place its artifact files in a separate directory.

In one or more embodiments, artifact extraction jobs can be applied, wherein each job performs a different extraction task based on criteria specified in the job description. The job description can be a simple text file. The first line can include a job identifier (e.g., a UUID) that uniquely identifies the job description, followed by a list of artifact locator identifiers, e.g., one per line. User interface 410 can be used to generate and track the extraction jobs, e.g., placing the job description in a first line of the job description file.

An extraction job can be created for each probe (e.g., network monitor, such as network monitor 110 in FIG. 1) specifying files of interest that are desired to be extracted and stored. The probe can include an artifact extraction job server that uses a directory to watch for extraction jobs, each job having a job description with a job ID (e.g., UUID). When a job is received, the extraction job server retrieves the job ID from the job description. After all artifact chunks are extracted, they are zipped into a file having a name based on the job ID.

The extraction job server can then call artifact store reader 402 with appropriate options and feed the sorted lists of artifact chunks into for forming the sorted lists of artifact chunks into artifact files. The artifact files are zipped into the zip file as described above.

The completed zip file (or a link for accessing the zip file) can be transmitted back to user interface 410, e.g., via a same connection (e.g., a HTTPS connection) used to transmit metadata from processing, using a header that indicates the type of content being sent (artifact file vs. metdata).

Figure 5:
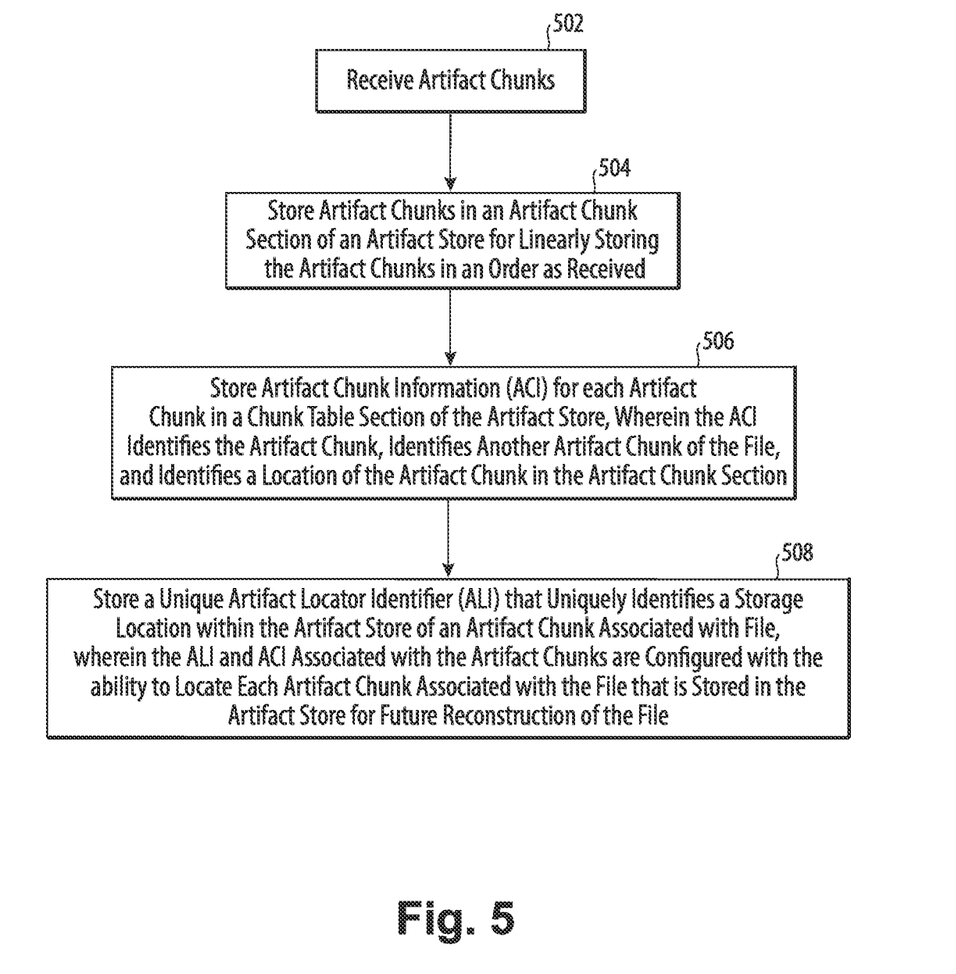
FIG. 5 is an example flowchart showing an example method of extracting files from network data, in accordance with an aspect of the disclosure.
Figure 6:
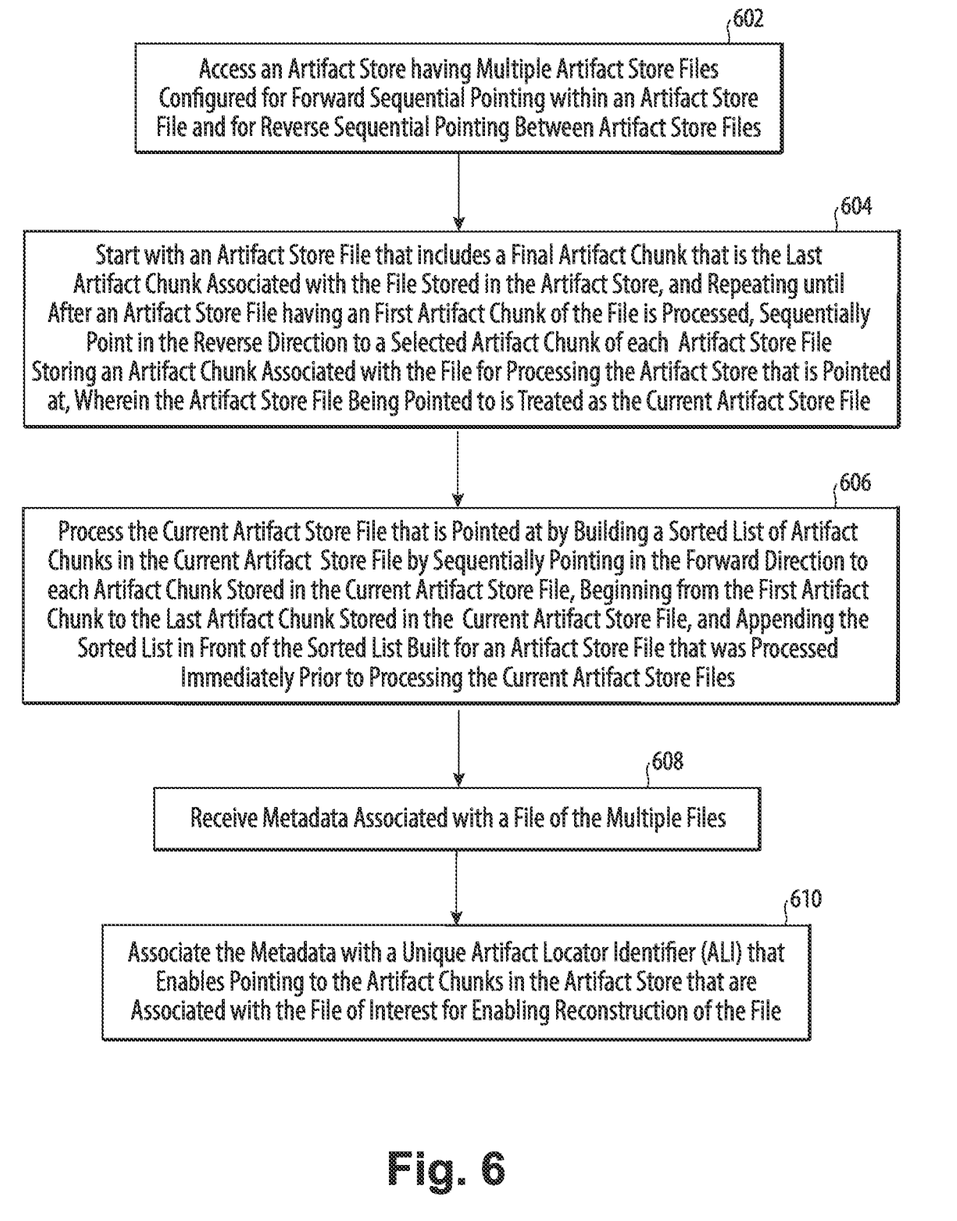
FIG. 6 is an example flowchart showing an example method of reconstructing files from extracted files, in accordance with an aspect of the disclosure.

With reference now to FIGS. 5 and 6, shown are flowcharts demonstrating implementation of the various exemplary embodiments. It is noted that the order of operations shown in FIGS. 5 and 6 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between devices or modules can be exchanged by a transmission between the devices or modules, or can include one device or module storing the data in a location that can be accessed by the other device or module.

FIG. 5 shows a flowchart 500 an example method of r extracting file content from a live stream of network data having multiple files. The operations can be performed while the network data is streaming in real time (or near real time), also referred to as live streaming. At block 502, artifact chunks are received, wherein each artifact chunk includes a portion of file content of a file of the multiple files as identified by deep packet inspection (DPI) at first capture of the network data. At operation 504, the artifact chunks are stored in an artifact chunk section of an artifact store for linearly storing the artifact chunks in an order as received. At operation 506, artifact chunk information (ACI) for each artifact chunk is stored in a chunk table section of the artifact store, wherein the ACI identifies the artifact chunk, identifies another artifact chunk of the file, and identifies a location of the artifact chunk in the artifact chunk section. In the examples provided, e.g., in reference to FIGS. 2 and 3, the identification and location of the artifact chunk can be the same, although this is not a requirement.

At operation 508, a unique artifact locator identifier (ALI) that uniquely identifies a storage location within the artifact store of an artifact chunk associated with file is stored, wherein the ALI and ACI associated with the artifact chunks are configured with the ability to locate each artifact chunk associated with the file that is stored in the artifact store for future reconstruction of the file.

In one or more embodiments, the ALI is stored in association with metadata output by the DPI process when it is performed at the first capture of the live stream of the network data.

In one or more embodiments, the artifact store is capable of including multiple artifact store files. Each artifact store file has an artifact chunk section and a chunk table section. Receiving the artifact chunks includes receiving multiple threads of artifact chunks. Each artifact store file is associated with only one thread of the multiple threads for storing artifact chunks of the thread into the artifact chunk section and storing corresponding ACI in the chunk table section of the artifact store file.

In one or more embodiments, when a storage capacity of the artifact store file associated with the thread is filled, a new artifact store file of the multiple artifact store files is provided for storing remaining artifact chunks of the thread into the artifact chunk section and storing ACI for remaining artifact chunks in the chunk table section of the new artifact store file. The ACI for the remaining artifact chunks associated with a file of the thread includes linkage information for identifying the ACI for artifact chunks associated with the file of the thread that are stored in the chunk table of the artifact store file for the future reconstruction of the file of the thread.

In one or more embodiments, the ACI for the artifact chunks associated with the file of the thread that are stored in the chunk table of the artifact store file identifies a next artifact chunk of the file that is stored in the chunk table of the same artifact store file.

In one or more embodiments, the artifact chunks stored in the artifact chunk section and the ACI stored in the chunk table section are retrievable by memory mapping.

In one or more embodiments, the ALI identifies a final artifact chunk of the file.

In one or more embodiments, extraction rules can be received that specify criteria for output of the DPI for including or excluding artifact chunks of an entire file from being stored in the artifact chunk section of the artifact store.

In one or more embodiments, each artifact store file includes a header that stores identification information that uniquely identifies the artifact store file. In one or more embodiments, an artifact store file of the multiple artifact store files can be deleted based on the identification information included in the header.

FIG. 6 shows a flowchart 600 of an example method of reconstructing a file from an artifact store, such as artifact store 114 shown in FIG. 1, the artifact store storing artifact chunks associated with multiple files extracted from a live stream of network data. At block 602, the artifact store is accessed, wherein the artifact store includes multiple artifact store files configured for forward sequential pointing within an artifact store file and for reverse sequential pointing between artifact store files.

At block 604, the method includes starting with an artifact store file that includes a final artifact chunk that is the last artifact chunk associated with the file stored in the artifact store and repeating, until after an artifact store file having an first artifact chunk of the file is processed, sequentially pointing in the reverse direction to a selected artifact chunk of each artifact store file storing an artifact chunk associated with the file for processing the artifact store that is pointed at, wherein the artifact store file being pointed to is treated as the current artifact store file.

In one or more embodiments, for a file, the selected artifact chunk of each artifact store file is the first artifact chunk associated with the file stored in the chunk table of the artifact store file.

At block 606, the method includes processing the current artifact store file that is pointed at by building a sorted list of artifact chunks in the current artifact store file by sequentially pointing in the forward direction to each artifact chunk stored in the current artifact store file, beginning from the first artifact chunk to the last artifact chunk stored in the current artifact store file, and appending the sorted list in front of the sorted list built for an artifact store file that was processed immediately prior to processing the current artifact store files.

At block 608, metadata is received that is associated with a file of the multiple files, wherein the metadata is meant to identify a file that is of interest for reconstruction.

At block 610, the metadata is associated with a unique artifact locator identifier (ALI) that enables pointing to the artifact chunks in the artifact store that are associated with the file of interest for enabling reconstruction of the file.

In one or more embodiments, the ALI identifies the last artifact chunk associated with the file.

In one or more embodiments, during reconstruction of a file, a determination is made whether an artifact chunk is missing for reconstruction of the file. If it is determined that an artifact chunk is missing, any artifact chunks identified during the reconstruction of the file prior to the determination that the artifact chunk is missing are removed.

In one or more embodiments, the method further includes receiving instructions identifying multiple files to be reconstructed and creating a sequential list of identification of all artifact chunks included in each of the multiple files using the ALI and ACI associated with the artifact chunks stored in the artifact store for each of the multiple files. The artifact chunks identified in the sequential list are sequentially read and, as each artifact chunk is read, a reconstructed file that was started for the file to which the artifact chunk is associated is identified. A reconstructed file for the file to which the artifact chunk is associated upon the condition that none were identified is started. The artifact chunk is appended to the end of the reconstructed file identified or that was started if none were identified.

In one or more embodiments, the number of multiple files allowed to be identified in the instructions is limited.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
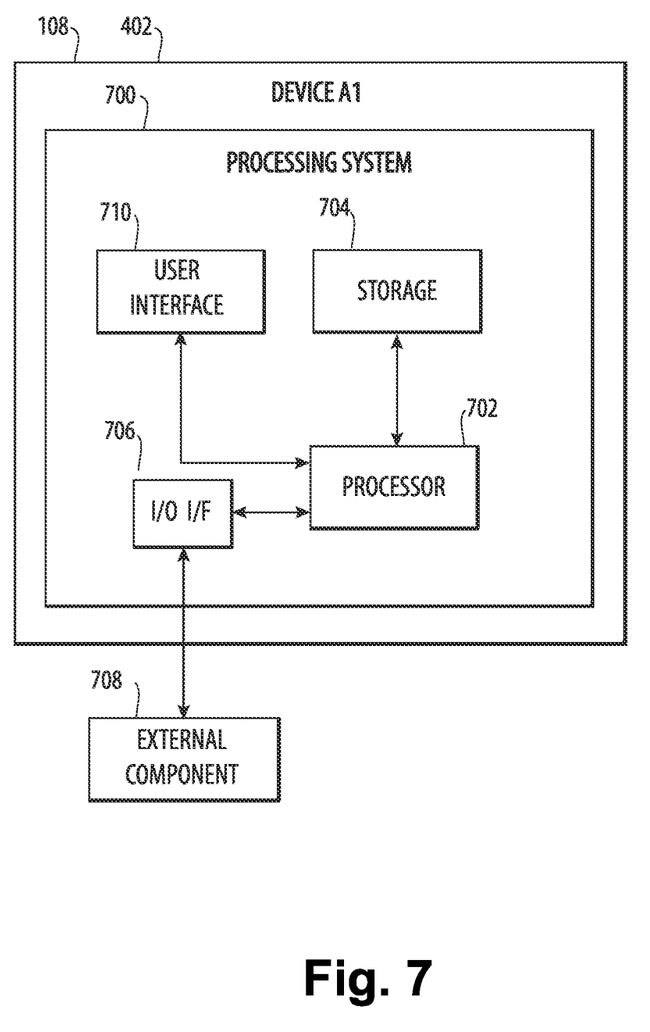
FIG. 7 illustrates an example computing system that could be used to implement the artifact store engine shown in FIG. 1 or the artifact store reader shown in FIG. 4, in accordance with an aspect of the disclosure.

With reference to FIG. 7, a block diagram of an example computing system 700 is shown, which provides an example configuration of artifact store engine 108 of FIG. 1 or artifact store reader 402 of FIG. 4 (shown as device A1). Additionally, all or portions of the artifact store engine 108 or artifact store reader 402 could be configured as software, and computing system 700 could represent such portions. Computing system 700 is only one example of a suitable system and is not intended to suggest any limitation as to the scope of use or functionality of embodiments of the disclosure described herein. Computing system 700 can be implemented using hardware, software, and/or firmware. Regardless, computing system 700 is capable of being implemented and/or performing functionality as set forth in the disclosure.

Computing system 700 is shown in the form of a general-purpose computing device. Computing system 700 includes a processing device 702, memory 704, an input/output (I/O) interface (I/F) 706 that can communicate with an internal component, such as a user interface 710, and optionally an external component 708.

The processing device 702 can include, for example, a programmable logic device (PLD), microprocessor, DSP, a microcontroller, an FPGA, an ASIC, and/or other discrete or integrated logic circuitry having similar processing capabilities.

The processing device 702 and the memory 704 can be included in components provided in the FPGA, ASIC, microcontroller, or microprocessor, for example. Memory 704 can include, for example, volatile and non-volatile memory for storing data temporarily or long term, and for storing programmable instructions executable by the processing device 702. Memory 704 can be a removable (e.g., portable) memory for storage of program instructions. I/O I/F 706 can include an interface and/or conductors to couple to the one or more internal components 710 and/or external components 708.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of artifact store engine 108 or artifact store reader 402 may be implemented or executed by one or more computer systems, such as a microprocessor. Each computer system 700 can be included within processing components of artifact store engine 108 or artifact store reader 402, or multiple instances thereof. In various embodiments, computer system 700 may include one or more of a microprocessor, an FPGA, application specific integrated circuit (ASIC), microcontroller. The computer system 700 can be provided as an embedded device. Portions of the computer system 700 can be provided externally, such by way of a virtual, centralized, and/or cloud-based computer.

Computer system 700 is only one example of a suitable system and is not intended to suggest any limitation as to the scope of use or functionality of embodiments of the disclosure described herein. Regardless, computer system 700 is capable of being implemented and/or performing any of the functionality set forth hereinabove.

Computer system 700 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method of extracting file content from a live stream of network data streaming multiple files, the method comprising:
    receiving artifact chunks, each artifact chunk including a portion of file content of a file of the multiple files as identified by deep packet inspection (DPI) at first capture of the network data;
    storing the artifact chunks in an artifact chunk section of an artifact store for linearly storing the artifact chunks in an order as received;
    storing artifact chunk information (ACI) for each artifact chunk in a chunk table section of the artifact store, the ACI identifying the artifact chunk, identifying another artifact chunk of the file, and identifying a location of the artifact chunk in the artifact chunk section; and
    storing a unique artifact locator identifier (ALI) that uniquely identifies a storage location within the artifact store of an artifact chunk associated with file, wherein the ALI and ACI associated with the artifact chunks are configured with the ability to locate each artifact chunk associated with the file that is stored in the artifact store for future reconstruction of the file, wherein the artifact store is capable of including multiple artifact store files, each artifact store file having an artifact chunk section and a chunk table section, wherein receiving the artifact chunks includes receiving multiple threads of artifact chunks, each artifact store file being associated with only one thread of the multiple threads for storing artifact chunks of the thread into the artifact chunk section and storing corresponding ACI in the chunk table section of the artifact store file and wherein each artifact store file includes a header that stores identification information that uniquely identifies the artifact store file, and whereby an artifact store file of the multiple artifact store files is deleted based on the identification information included in the header.

2. The method of claim 1, wherein the ALI is stored in association with metadata output and stored when the DPI is performed at the first capture of the live stream of the network data.

3. The method of claim 1, wherein when a storage capacity of the artifact store file associated with the thread is filled, a new artifact store file of the multiple artifact store files is provided for storing remaining artifact chunks of the thread into the artifact chunk section and storing ACI for remaining artifact chunks in the chunk table section of the new artifact store file, and the ACI for the remaining artifact chunks associated with a file of the thread includes linkage information for identifying the ACI for artifact chunks associated with the file of the thread that are stored in the chunk table of the artifact store file for the future reconstruction of the file of the thread.

4. The method of claim 3, wherein the ACI for the artifact chunks associated with the file of the thread that are stored in the chunk table of the artifact store file identifies a next artifact chunk of the file that is stored in the chunk table of the same artifact store file.

5. The method of claim 1, wherein the artifact chunks stored in the artifact chunk section and the ACI stored in the chunk table section are retrievable by memory mapping.

6. The method of claim 1, wherein the ALI identifies a final artifact chunk of the file.

7. The method of claim 1, further comprising receiving extraction rules specifying criteria for output of the DPI for including or excluding artifact chunks of an entire file from being stored in the artifact chunk section of the artifact store.

8. The method of claim 1, further comprising:

creating a sequential list of identification of all artifact chunks included in the file using the ALI and ACI associated with the artifact chunks stored in the artifact store; and sequentially reading the artifact chunks identified in the sequential list; and combining the read artifact chunks into a reconstructed file that is a reconstruction of the file.

9. The method of claim 8, further comprising:

receiving metadata identifying the file to be reconstructed; and obtaining the ALI based on its association with the metadata received.

10. The method of claim 8, further comprising:

determining whether an artifact chunk is missing for reconstruction of the file, in response to determining that an artifact chunk is missing, removing any artifact chunks identified during the reconstruction of the file prior to the determination that the artifact chunk is missing.

11. The method of claim 1, further comprising:

receiving instructions identifying multiple files to be reconstructed;

creating a sequential list of identification of all artifact chunks included in each of the multiple files using the ALI and ACI associated with the artifact chunks stored in the artifact store for each of the multiple files;

sequentially reading the artifact chunks identified in the sequential list; and as each artifact chunk is read, identify a reconstructed file that was started for the file to which the artifact chunk is associated;

start a reconstructed file for the file to which the artifact chunk is associated upon the condition that none were identified; and append the artifact chunk to the end of the reconstructed file identified or that was started if none were identified.

12. The method of claim 11, further comprising limiting the number of multiple files allowed to be identified in the instructions.

* * * * *